(12) United States Patent
Nourbakhsh et al.

(10) Patent No.: US 12,093,642 B2
(45) Date of Patent: Sep. 17, 2024

(54) METHOD AND SYSTEM FOR CONDITIONED GENERATION OF DESCRIPTIVE COMMENTARY FOR QUANTITATIVE DATA

(71) Applicant: JPMorgan Chase Bank, N.A., New York, NY (US)

(72) Inventors: Armineh Nourbakhsh, Pittsburgh, PA (US); Vineeth Ravi, Jersey City, NJ (US); Sameena Shah, Scarsdale, NY (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 151 days.

(21) Appl. No.: 17/456,321

(22) Filed: Nov. 23, 2021

(65) Prior Publication Data

US 2022/0171922 A1 Jun. 2, 2022

Related U.S. Application Data

(60) Provisional application No. 63/119,893, filed on Dec. 1, 2020.

(51) Int. Cl.
*G06F 40/18* (2020.01)
*G06F 3/0481* (2022.01)
*G06F 9/451* (2018.01)
*G06F 40/40* (2020.01)
*G06N 20/00* (2019.01)

(52) U.S. Cl.
CPC ............ *G06F 40/18* (2020.01); *G06F 3/0481* (2013.01); *G06F 9/451* (2018.02); *G06F 40/40* (2020.01); *G06N 20/00* (2019.01)

(58) Field of Classification Search
CPC ........ G06F 3/0481; G06F 9/451; G06F 40/18; G06F 40/40; G06N 20/00
See application file for complete search history.

(56) References Cited

U.S. PATENT DOCUMENTS

| | | | | |
|---|---|---|---|---|
| 6,865,258 B1 * | 3/2005 | Polcyn | ................... | G10L 15/26 |
| | | | | 379/265.09 |
| 7,142,728 B2 * | 11/2006 | Wnek | .................. | G06V 30/416 |
| | | | | 382/173 |
| 7,236,932 B1 * | 6/2007 | Grajski | ................... | G10L 15/26 |
| | | | | 704/235 |
| 8,914,419 B2 * | 12/2014 | Gerard | .............. | G06F 16/24522 |
| | | | | 707/802 |
| 10,303,771 B1 * | 5/2019 | Jezewski | ............. | G06F 18/2413 |

(Continued)

*Primary Examiner* — Eric J. Bycer
(74) *Attorney, Agent, or Firm* — GREENBLUM & BERNSTEIN, P.L.C.

(57) ABSTRACT

A method for using artificial intelligence and machine learning to automatically generate commentary that relates to quantitative data is provided. The method includes: receiving a first tabular data set; identifying a first cell having numeric data from within the first tabular data set; associating a first column header and a first row header with the first cell; assigning a respective header type to each of the first column header and the first row header; mapping each of the first cell, the first column header, and the first row header to a first comment from among a set of comments; and augmenting the first comment by generating additional text that supplements the first comment.

20 Claims, 14 Drawing Sheets

(56) References Cited

U.S. PATENT DOCUMENTS

| | | | |
|---|---|---|---|
| 10,417,577 B2* | 9/2019 | Bowers | G06F 9/453 |
| 2004/0117739 A1* | 6/2004 | Challenger | G06F 16/84 |
| | | | 715/251 |
| 2006/0288268 A1* | 12/2006 | Srinivasan | G06F 40/205 |
| | | | 715/210 |
| 2007/0022373 A1* | 1/2007 | Chidlovskii | G06F 40/143 |
| | | | 715/210 |
| 2011/0107254 A1* | 5/2011 | Moroze | G06F 40/177 |
| | | | 715/782 |
| 2012/0022865 A1* | 1/2012 | Milstein | H04M 3/42221 |
| | | | 704/235 |
| 2013/0054613 A1* | 2/2013 | Bishop | G06F 16/93 |
| | | | 707/E17.046 |
| 2013/0318426 A1* | 11/2013 | Shu | G06V 30/412 |
| | | | 715/226 |
| 2016/0203217 A1* | 7/2016 | Anisingaraju | G06Q 10/067 |
| | | | 707/738 |
| 2017/0235888 A1* | 8/2017 | Rahman | G06F 40/211 |
| | | | 705/3 |
| 2018/0246883 A1* | 8/2018 | Wang | G06F 17/18 |
| 2019/0145153 A1* | 5/2019 | Edelman | H02S 40/38 |
| | | | 297/188.01 |
| 2019/0266394 A1* | 8/2019 | Yu | G06V 30/413 |
| 2020/0175267 A1* | 6/2020 | Schäfer | G06V 30/413 |
| 2020/0342051 A1* | 10/2020 | Ghatage | G06N 20/00 |
| 2021/0117668 A1* | 4/2021 | Zhong | G06N 3/044 |
| 2021/0278957 A1* | 9/2021 | Canneto | G06N 20/00 |

* cited by examiner

| New Unit Sales (units) | Dec-17 | Dec-18 | Dec-19 |
|---|---|---|---|
| DEALERSHIP A | 2,001 | 1,935 | 1,762 |
| DEALERSHIP B | 300 | 825 | 610 |
| DEALERSHIP C | 156 | 190 | 201 |
|  | 0 | 0 | 0 |
|  | 0 | 0 | 0 |
| Total: | 2,457 | 2,950 | 2,573 |

| Entity | Metric | Period | Value |
|---|---|---|---|
| DEALERSHIP C | New Unit Sales (units) | Dec-19 | 201 |

"ABC Revenue grew by $260K or 8% during 2018, driven by strong Unit Sales."

| Entity | Metric | Period | Value | Unit | Scale | Score 1 | Score 2 |
|---|---|---|---|---|---|---|---|
| ABC | Net sales | FYE Dec-18 | 260 | USD | Thousands | MED | LOW |
| ABC | Revenue Change % | FYE Dec-18 | 2.6% | - | - | MED | LOW |
| ABC | Revenue Change | FYE Dec-17 to FYE Dec-18 | 256 | USD | Thousands | HIGH | LOW |
| ABC | Revenue Change % | FYE Dec-17 to FYE Dec-18 | 7.7% | - | - | LOW | HIGH |

"ABC Revenue grew by $260K or 8% during 2018, driven by strong Unit Sales."

[COMM] → [SUBJECT] [CHANGE EXPR] [DELTA] [TEMP EXPR] [PERIOD] (0.15)
[COMM] → [SUBJECT] [CHANGE EXPR] [DELTA] [TEMP EXPR] [PERIOD] [CONTEXT] (0.75)
[SUBJECT] → [METRIC] (0.2)
[SUBJECT] → [ENTITY][METRIC] (0.8)
[DELTA] → [CURRENCY] (0.1)
[DELTA] → [PCT] (0.0)
[DELTA] → [CURRENCY]["OR"][PCT] (0.9)
[PERIOD] → [FY] (1.0)
[PERIOD] → [RANGE] (0.0)
[CONTEXT] → ["DRIVEN BY"][COMM] (1.0)
[CONTEXT] → ["OFFSET BY"][COMM] (0.0)
...

METHOD AND SYSTEM FOR CONDITIONED GENERATION OF DESCRIPTIVE COMMENTARY FOR QUANTITATIVE DATA

CROSS-REFERENCE TO RELATED APPLICATIONS

This application claims priority benefit from U.S. Provisional Application No. 63/119,893, filed Dec. 1, 2020, which is hereby incorporated by reference in its entirety.

BACKGROUND

1. Field of the Disclosure

This technology generally relates to methods and systems for analyzing numerical data, and more particularly to methods and systems for using artificial intelligence and machine learning to automatically generate commentary that relates to quantitative data.

2. Background Information

In financial institutions, many business professionals spend hours every week analyzing numeric data such as market movements, risk indicators, credit card spending trends, and other datasets stored in various systems and spreadsheets. Insights derived from these datasets are used to write reports, generate graphs, create PowerPoint decks, and send email alerts. In many cases, the process can be repetitive and labor-intensive. For instance an analyst might need to send a comprehensive update on the most important market risk indicators every day.

As a first example, financial reports such as a Securities and Exchange Commission (SEC) Form 10-Q report may be generated on a regular basis. Such reports typically include tabular data as well as commentary based on tabular data.

For example, such commentary may reflect an analysis of various financial indicators compared to previous years, and the main drivers and offsets of the financial indicators may be disclosed. This type of analysis may generally be referred to as "driver/offset analysis".

As another example, a Credit Risk Early Warning (CREW) team may monitor credit risk factors in various geographical locations, which are primarily designated by Metropolitan State Areas (MSAs). On a monthly basis, the team may generate reports describing the latest Risk Factors (RF). The following are examples of commentary:
1) 35 MSAs are triggering 5+ RF for Oct'19; increase is due to ABC MSA triggering 2+ RF ($7.9B), driven by decreasing payment rate and increasing high debt population. 2) 9 MSAs triggered 3 or more Risk Factors (RF). This represents a decline of 56 MSAs or $13B YoY. 3) The improvement in MSAs triggers is primarily driven by the High Risk trigger (low score & low payment rate concentration). 4) Of the Top 50 MSA, risk is stable with: 4a) None of the top 50 MSAs have 4+RF. 4b) 6 MSAs triggered 1RF vs 7 MSAs in March 2017.

The commentary discusses various RFs with regards to the MSAs in which they occur. This type of commentary requires a more sophisticated analysis than the driver/offset case. In this use case, MSAs must be sorted by the number of RFs that they trigger. Top MSAs in terms of RFs need to be identified and their overall contribution to the portfolio needs to be calculated. Eventually, the commentary would be generated by algorithms, which would surface anomalous patterns and identify risks using machine learning and artificial intelligence (AI) techniques.

As yet another example, the potential impact of the COVID-19 pandemic on credit card spending is of great interest. In April 2020, a use case that relates to identifying anomalies in spending behaviors compared to the pre-pandemic period was presented. An artificial intelligence module that relates to financial insights was configured to address this use case by adding anomaly-detection to its catalogue of available insights. Anomalies are reported as weekly deltas in credit card spending, and contextualized by the re-opening status of the corresponding states (e.g., states under lockdown versus partially reopened states versus reopened states). There is now an interactive user interface (UI) that allows users to parse the spending data based on various factors such as the type of merchant, card type, age of card holder, level of income, etc.

As still another example, pitch decks may be developed for current and prospective clients in the automobile dealership market. The pitch decks discuss various insights that position a financial institution as a favorable provider of loans, including insights derived from macroeconomic indicators, the U.S. auto market, performance metrics associated with the target dealership, and the dealership's peer group. As such, the insights disclosed in these decks are more diverse than the previous use cases, and require more sophisticated setup and configurability.

As can be seen from the four examples above, there is a high degree of variability among the use cases along the following dimensions: 1) The type of insight (e.g., driver/offset analysis, anomaly detection, etc.); 2) the utility function that determines how the insights should be ranked (e.g., highest dollar impact, highest percentage change impact, highest anomaly, etc.); and 3) an amount of data that is available. Some teams may have many prior examples of manually generated reports, while other teams might have a very small collection of examples. For instance, market risk teams generate weekly (and sometimes daily) driver/offset reports, whereas 10-Q analysts only generate one report per quarter.

Accordingly, there is a need for a solution that uses Artificial Intelligence and Machine Learning to automatically generate commentary, in order to reduce human effort across all use cases.

SUMMARY

The present disclosure, through one or more of its various aspects, embodiments, and/or specific features or sub-components, provides, inter alia, various systems, servers, devices, methods, media, programs, and platforms for using artificial intelligence and machine learning to automatically generate commentary that relates to quantitative data.

According to an aspect of the present disclosure, a method for using artificial intelligence and machine learning to automatically generate commentary that relates to quantitative data is provided. The method is implemented by at least one processor. The method includes: receiving, by the at least one processor, a first tabular data set; identifying, by the at least one processor, a first cell having numeric data from within the first tabular data set; associating, by the at least one processor, a first column header and a first row header with the first cell; assigning, by the at least one processor, a respective header type to each of the first column header and the first row header; mapping, by the at least one processor, each of the first cell, the first column header, and the first row header to a first comment from among a plurality of comments; and augmenting, by the at least one processor, the first comment by generating additional text that supplements the first comment.

Each respective header type may include at least one from among a named entity header type, a time period header type, a metric header type, and a numerical value header type.

The plurality of comments may be stored in a memory that includes a historical record of comments previously provided by users. The mapping may include using a machine learning algorithm to select the first comment from among the plurality of comments based on the numeric data included in the first cell, the associated first column header, the assigned first column header type, the associated first row header, and the assigned first row header type.

The augmenting may include using a Natural Language Processing (NLP) algorithm for generating the additional text.

The NLP algorithm may implement a set of probabilistic context free grammar (PCFG) rules for generating the additional text.

The method may further include displaying, via a graphical user interface (GUI), each of the first comment and the additional text that supplements the first comment. The first tabular data set may be received from a user via the GUI.

The method may further include receiving, from the user via the GUI, a file that includes the plurality of comments.

The method may further include displaying, via the GUI, information that indicates a confidence level associated with each of the first comment and the additional text that supplements the first comment.

The method may further include: receiving, from the user via the GUI, feedback information that relates to the first comment and the additional text that supplements the first comment; and revising at least one from among the first comment and the additional text that supplements the first comment based on the received feedback information.

According to another aspect of the present disclosure, a computing apparatus for providing loan bid information to a prospective borrower is provided. The computing apparatus includes a processor; a memory; and a communication interface coupled to each of the processor and the memory. The processor is configured to: receive, via the communication interface, a first tabular data set; identify a first cell having numeric data from within the first tabular data set; associate a first column header and a first row header with the first cell; assign a respective header type to each of the first column header and the first row header; map each of the first cell, the first column header, and the first row header to a first comment from among a plurality of comments; and augment the first comment by generating additional text that supplements the first comment.

Each respective header type may include at least one from among a named entity header type, a time period header type, a metric header type, and a numerical value header type.

The plurality of comments may be stored in the memory that includes a historical record of comments previously provided by users. The processor may be further configured to perform the mapping by using a machine learning algorithm to select the first comment from among the plurality of comments based on the numeric data included in the first cell, the associated first column header, the assigned first column header type, the associated first row header, and the assigned first row header type.

The processor may be further configured to perform the augmenting by using a Natural Language Processing (NLP) algorithm for generating the additional text.

The NLP algorithm may implement a set of probabilistic context free grammar (PCFG) rules for generating the additional text.

The processor may be further configured to display, on a display via a graphical user interface (GUI), each of the first comment and the additional text that supplements the first comment. The first tabular data set may be received from a user via the GUI.

The processor may be further configured to receive, from the user via the GUI and the communication interface, a file that includes the plurality of comments.

The processor may be further configured to display, via the GUI, information that indicates a confidence level associated with each of the first comment and the additional text that supplements the first comment.

The processor may be further configured to: receive, from the user via the GUI and the communication interface, feedback information that relates to the first comment and the additional text that supplements the first comment; and revise at least one from among the first comment and the additional text that supplements the first comment based on the received feedback information.

According to yet another aspect of the present disclosure, a non-transitory computer readable storage medium storing instructions for generating commentary with respect to quantitative data is provided. The storage medium includes executable code which, when executed by a processor, causes the processor to: receive a first tabular data set; identify a first cell having numeric data from within the first tabular data set; associate a first column header and a first row header with the first cell; assign a respective header type to each of the first column header and the first row header; map each of the first cell, the first column header, and the first row header to a first comment from among a plurality of comments; and augment the first comment by generating additional text that supplements the first comment.

Each respective header type may include at least one from among a named entity header type, a time period header type, a metric header type, and a numerical value header type.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6A is a diagram that illustrates a parsing of tabular structures in a method for using artificial intelligence and machine learning to automatically generate commentary that relates to quantitative data, according to an exemplary embodiment.

FIG. 6B is an example of an entity tagging process based on the data point highlighted in FIG. 6A in a method for using artificial intelligence and machine learning to automatically generate commentary that relates to quantitative data, according to an exemplary embodiment.

FIG. 7 is a visual representation of mapping sentences to data tables in a method for using artificial intelligence and machine learning to automatically generate commentary that relates to quantitative data, according to an exemplary embodiment.

FIG. 8 is an example that illustrates a modeling of language by using Probabilistic Context Fee Grammar (PCFG) rules in a method for using artificial intelligence and machine learning to automatically generate commentary that relates to quantitative data, according to an exemplary embodiment.

FIG. 11 is a screenshot that illustrates a user interface display of how commentary has been linked to numeric data in a method for using artificial intelligence and machine learning to automatically generate commentary that relates to quantitative data, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
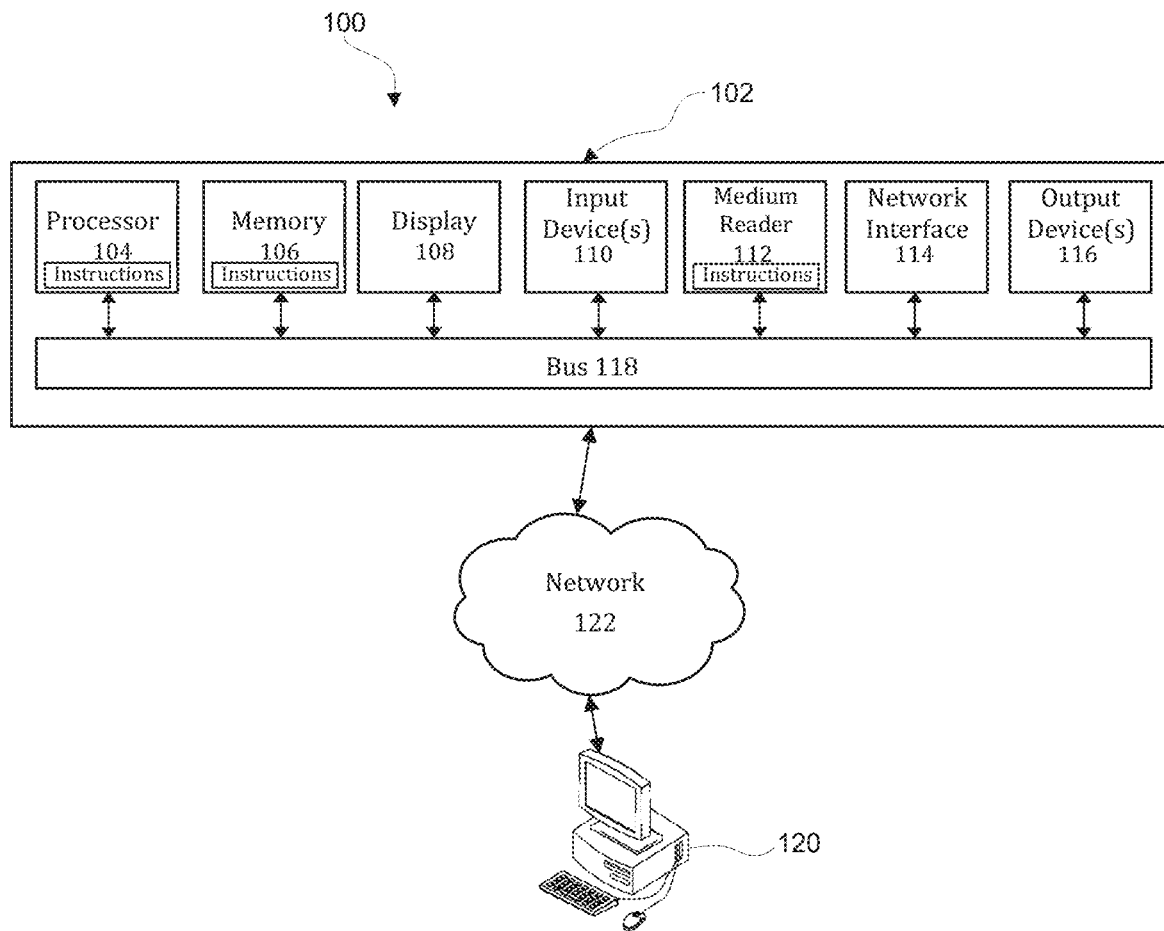
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using artificial intelligence and machine learning to automatically generate commentary that relates to quantitative data.

Figure 2:
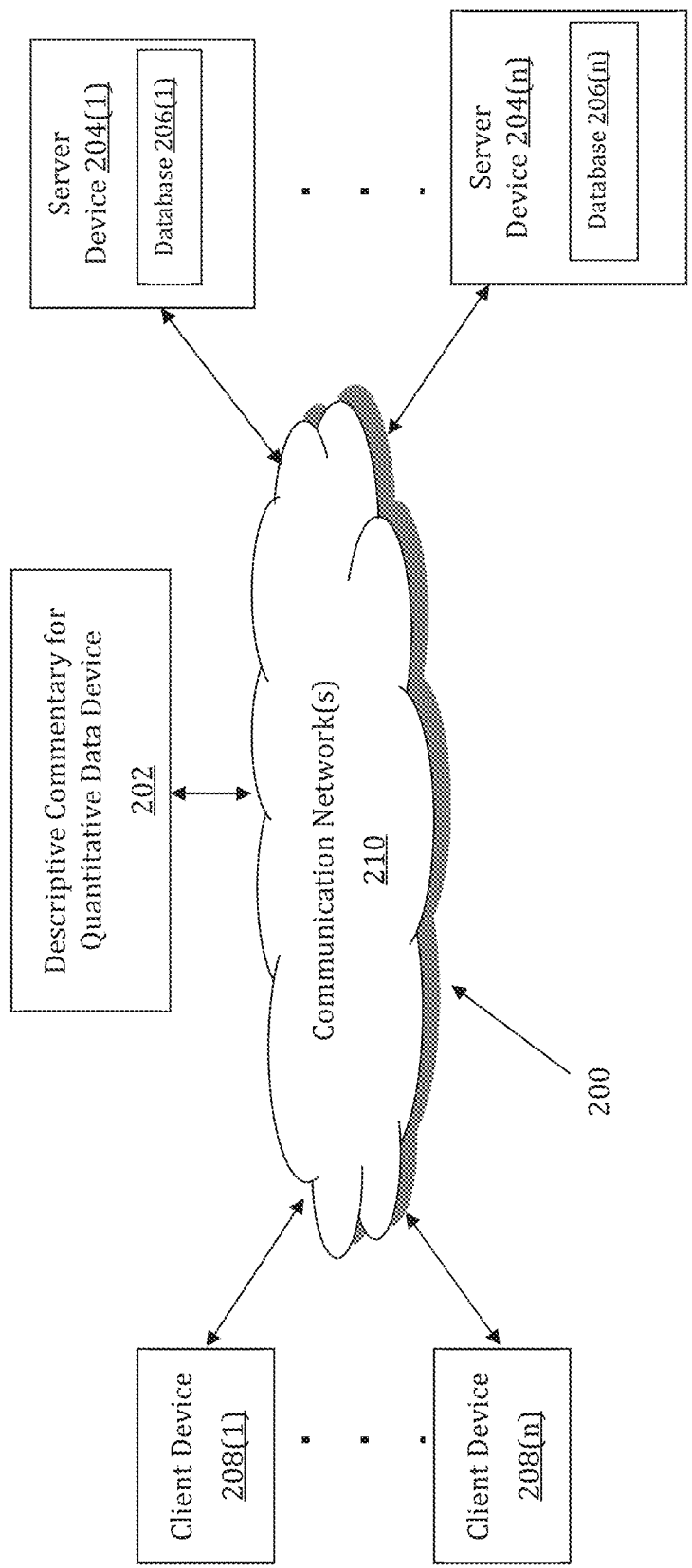
FIG. 2 illustrates an exemplary diagram of a network environment.

Referring to FIG. 2, a schematic of an exemplary network environment 200 for implementing a method for using artificial intelligence and machine learning to automatically generate commentary that relates to quantitative data is illustrated. In an exemplary embodiment, the method is executable on any networked computer platform, such as, for example, a personal computer (PC).

The method for using artificial intelligence and machine learning to automatically generate commentary that relates to quantitative data may be implemented by a Descriptive Commentary for Quantitative Data (DCQD) device 202. The DCQD device 202 may be the same or similar to the computer system 102 as described with respect to FIG. 1. The DCQD device 202 may store one or more applications that can include executable instructions that, when executed by the DCQD device 202, cause the DCQD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DCQD device 202 itself, may be located in virtual server(s) running in a cloud-based computing environment rather than being tied to one or more specific physical network computing devices. Also, the application(s) may be running in one or more virtual machines (VMs) executing on the DCQD device 202. Additionally, in one or more embodiments of this technology, virtual machine(s) running on the DCQD device 202 may be managed or supervised by a hypervisor.

In the network environment 200 of FIG. 2, the DCQD device 202 is coupled to a plurality of server devices 204(1)-204(n) that hosts a plurality of databases 206(1)-206(n), and also to a plurality of client devices 208(1)-208(n) via communication network(s) 210. A communication interface of the DCQD device 202, such as the network interface 114 of the computer system 102 of FIG. 1, operatively couples and communicates between the DCQD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DCQD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DCQD devices that efficiently implement a method for using artificial intelligence and machine learning to automatically generate commentary that relates to quantitative data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DCQD device 202 may be a standalone device or integrated with one or more other devices or apparatuses, such as one or more of the server devices 204(1)-204(n), for example. In one particular example, the DCQD device 202 may include or be hosted by one of the server devices 204(1)-204(n), and other arrangements are also possible. Moreover, one or more of the devices of the DCQD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DCQD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to historical tabular reports and numeric data and data that relates to descriptive commentary.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DCQD device 202 via communication network(s) 210. Accordingly, the client devices 208(1)-208(n) may be mobile computing devices, desktop computing devices, virtual computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DCQD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DCQD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DCQD device 202, the server devices 204(1)-204(n), or the client devices 208(1)-208(n), for example, may be configured to operate as virtual instances on the same physical machine. In other words, one or more of the DCQD device 202, the server devices 204(1)-204(n), or the client devices 208(1)-208(n) may operate on the same physical device rather than as separate devices communicating through communication network(s) 210. Additionally, there may be more or fewer DCQD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
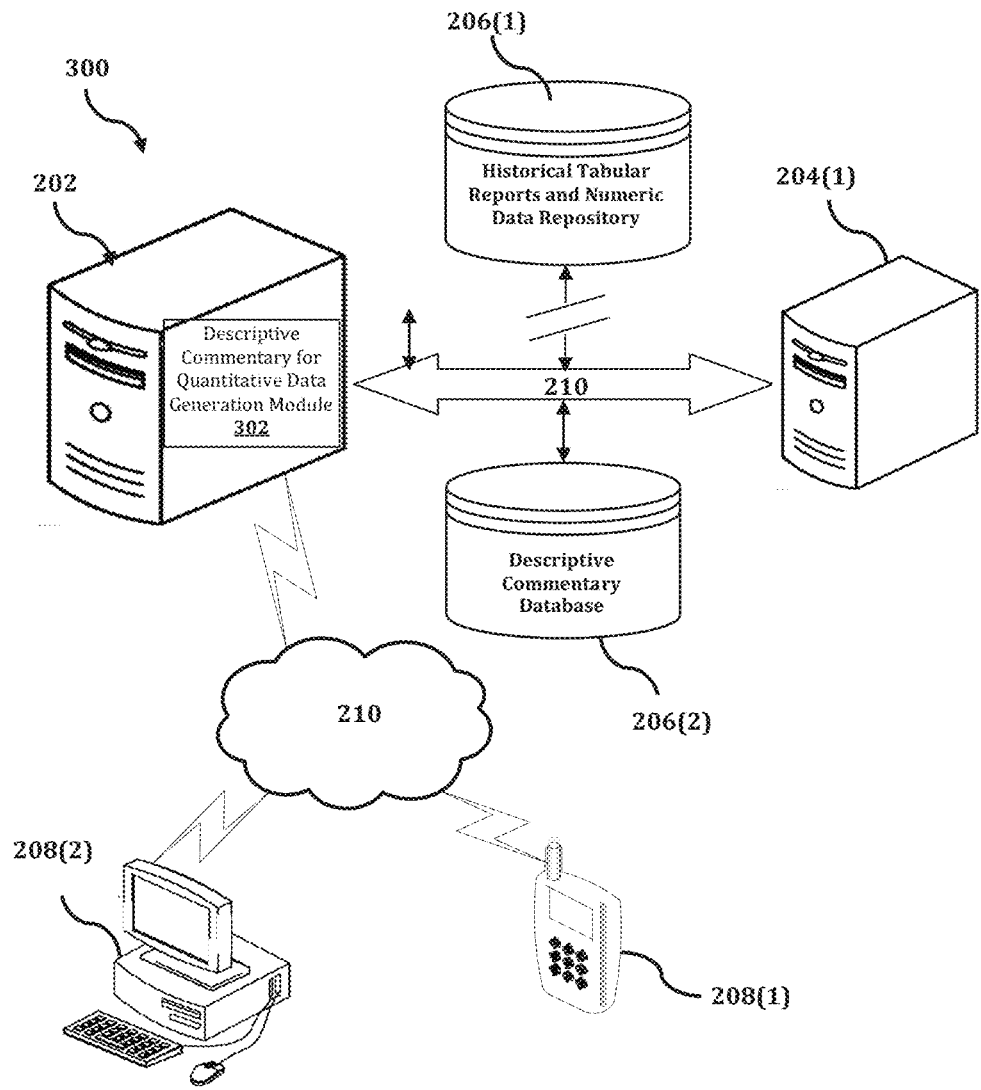
FIG. 3 shows an exemplary system for implementing a method for using artificial intelligence and machine learning to automatically generate commentary that relates to quantitative data.

The DCQD device 202 is described and illustrated in FIG. 3 as including a descriptive commentary for quantitative data generation module 302, although it may include other rules, policies, modules, databases, or applications, for example. As will be described below, the descriptive commentary for quantitative data generation module 302 is configured to implement a method for using artificial intelligence and machine learning to automatically generate commentary that relates to quantitative data.

An exemplary process 300 for implementing a mechanism for using artificial intelligence and machine learning to automatically generate commentary that relates to quantitative data by utilizing the network environment of FIG. 2 is illustrated as being executed in FIG. 3. Specifically, a first client device 208(1) and a second client device 208(2) are illustrated as being in communication with DCQD device 202. In this regard, the first client device 208(1) and the second client device 208(2) may be "clients" of the DCQD device 202 and are described herein as such. Nevertheless, it is to be known and understood that the first client device 208(1) and/or the second client device 208(2) need not necessarily be "clients" of the DCQD device 202, or any entity described in association therewith herein. Any additional or alternative relationship may exist between either or both of the first client device 208(1) and the second client device 208(2) and the DCQD device 202, or no relationship may exist.

Further, DCQD device 202 is illustrated as being able to access a historical tabular reports and numeric data repository 206(1) and a descriptive commentary database 206(2). The descriptive commentary for quantitative data generation module 302 may be configured to access these databases for implementing a method for using artificial intelligence and machine learning to automatically generate commentary that relates to quantitative data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DCQD device 202 via broadband or cellular communication. Of course, these embodiments are merely exemplary and are not limiting or exhaustive.

Upon being started, the descriptive commentary for quantitative data generation module 302 executes a process for using artificial intelligence and machine learning to automatically generate commentary that relates to quantitative data. An exemplary process for using artificial intelligence and machine learning to automatically generate commentary that relates to quantitative data is generally indicated at flowchart 400 in FIG. 4.

Figure 4:
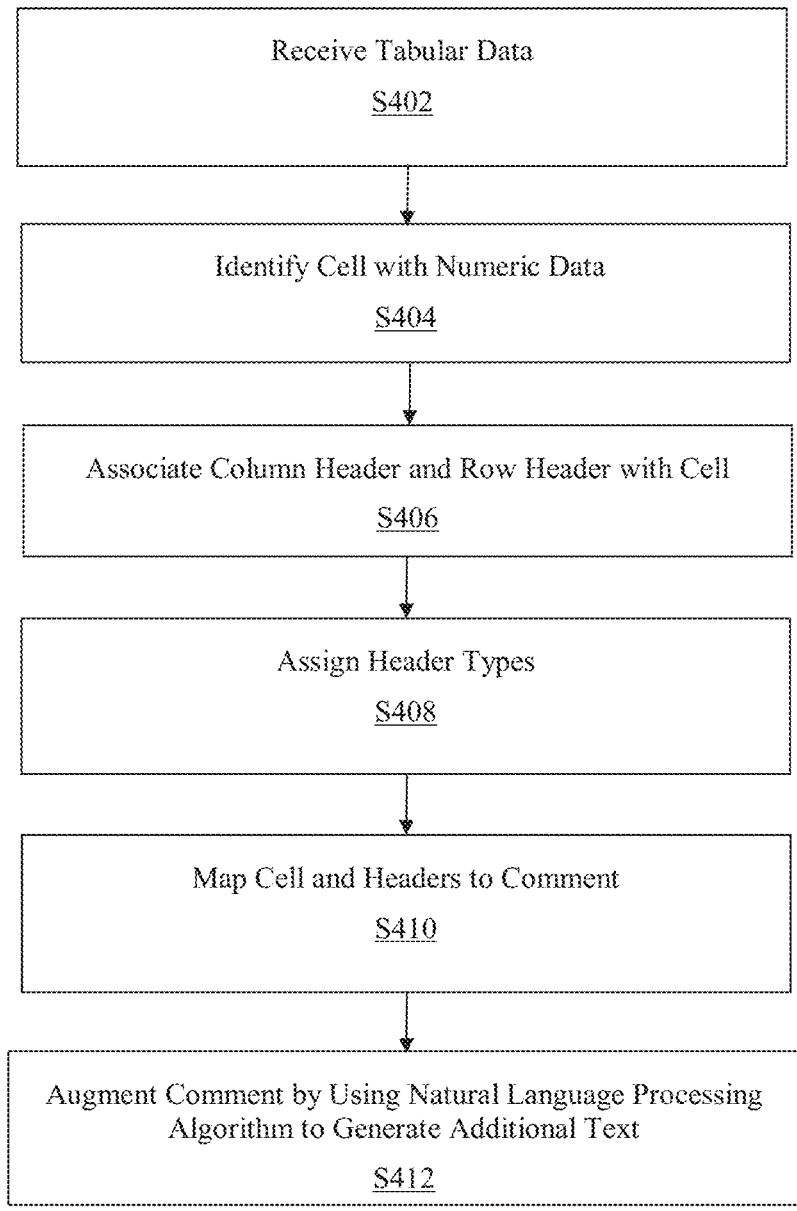
FIG. 4 is a flowchart of an exemplary process for implementing a method for using artificial intelligence and machine learning to automatically generate commentary that relates to quantitative data.
Figure 11:
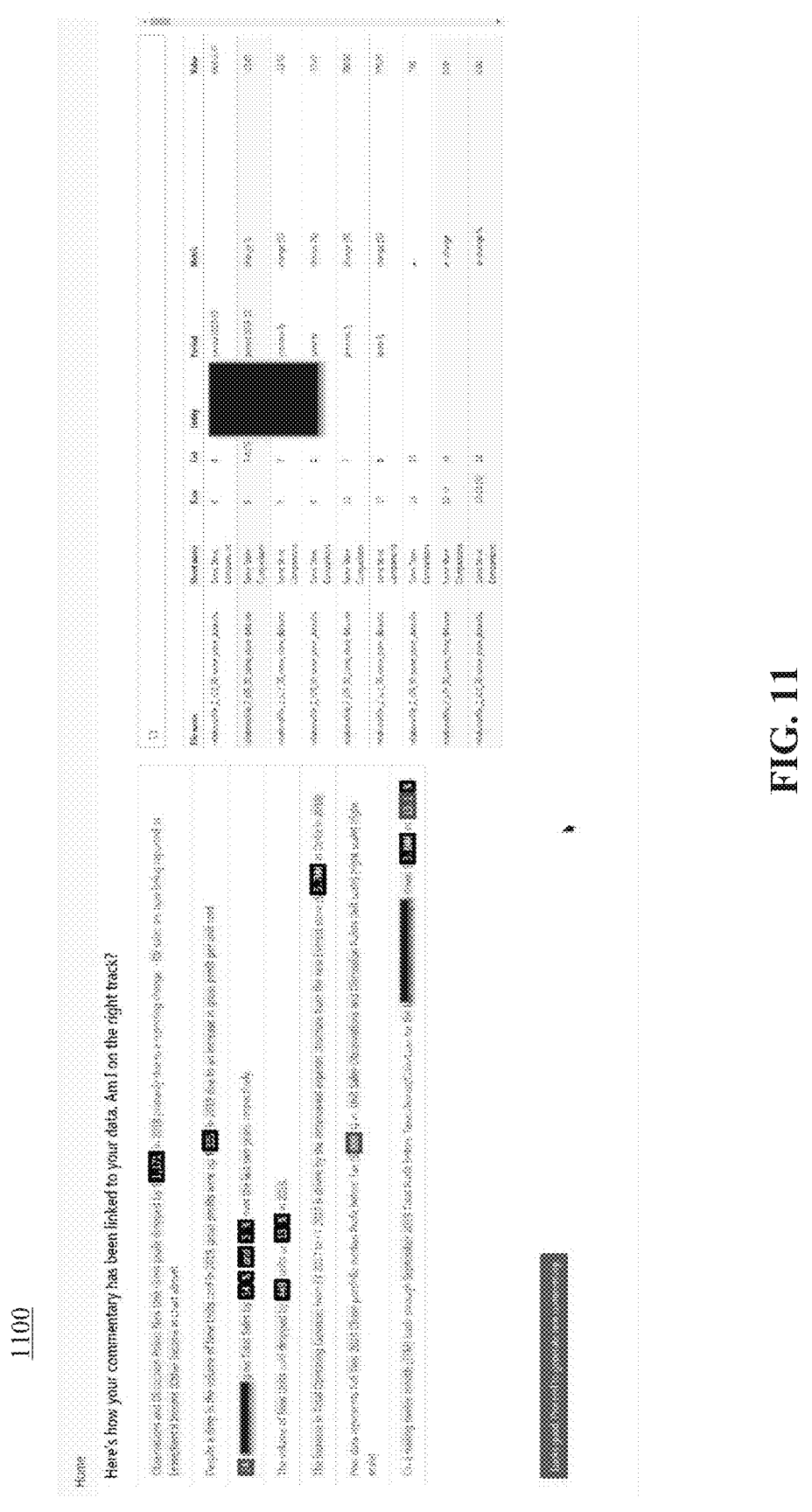

In process 400 of FIG. 4, at step S402, the descriptive commentary for quantitative data generation module 302 receives a set of tabular data. In an exemplary embodiment, a graphical user interface (GUI) may be displayed on a screen, and a user may be prompted to enter one or more files that include tabular data, as illustrated in FIG. 11 and further described below.

At step S404, the descriptive commentary for quantitative data generation module 302 identifies at least one cell that includes numeric data from within the set of tabular data received in step S402. Then, at step S406, the descriptive commentary for quantitative data generation module 302 associates a column header and a row header with the identified cell. In an exemplary embodiment, the association of a column header and a row header with a cell that includes numeric data may be performed as illustrated in FIG. 7A.

At step S408, the descriptive commentary for quantitative data generation module 302 assigns a respective header type to each of the column header and the row header. In an exemplary embodiment, the assignment of a header type is performed by using entity tagging technology. The header types to be assigned may include any one or more of a named entity header type, a time period header type, a metric header type, and a numerical value header type.

At step S410, the descriptive commentary for quantitative data generation module 302 maps the identified cell and the associated column header and row header to a first comment. In an exemplary embodiment, a set of first comments is stored in a memory that includes a historical record of comments previously provided by users, such as, for example, the descriptive commentary database 206(2). Alternatively, the set of first comments may be provided by a user via the GUI. In an exemplary embodiment, the mapping may be performed by using a machine learning algorithm to select the first comment based on the numeric data included in the identified cell, the associated column header and column header type, and the associated row header and row header type.

At step S412, the descriptive commentary for quantitative data generation module 302 augments the first comment by generating additional text that supplements the first comment. In an exemplary embodiment, the augmentation may be performed by using a Natural Language Processing (NLP) algorithm for generating the additional text. In an exemplary embodiment, the NLP algorithm may implement a set of Probabilistic Context Free Grammar (PCFG) rules for generating the additional text.

In an exemplary embodiment, after the additional text has been generated, the descriptive commentary for quantitative data generation module 302 may display, via the GUI, the first comment and the additional text that has been generated to augment the first comment. The descriptive commentary for quantitative data generation module 302 may also display information that indicates a confidence level associated with each of the first comment and the additional text, and may prompt a user to provide feedback as to whether the user agrees with the commentary. If the user provides input via the GUI that indicates that the user does not agree with the commentary, then the descriptive commentary for quantitative data generation module 302 may revise either or both of the first comment and the additional text based on the user feedback.

According to an exemplary embodiment, the present disclosure provides a description of an AI-powered framework that is also referred to herein as CMent, which stands for "using Contextualized Mentions to generate text from underlying data". CMent is a framework that uses Natural Language Processing (NLP) and machine learning to process numeric data and generate descriptive commentary. In an exemplary embodiment, CMent is not limited to the example use cases described above, and can scale to any use case that involves numeric data and quantitative commentary.

In an exemplary embodiment, in order to make CMent scalable, an interactive workflow that allows CMent to learn from very few examples is implemented into the design. The workflow enables users to guide CMent in its learning process, making sure that it can capture relevant insights for their intended commentary.

There are several advantages over the existing state-of-the-art (SOTA) by adopting this framework, including the following.

1) In an exemplary embodiment, the framework is capable of generating a larger number of text-data alignment pairs and utilizes more sophisticated semantic representations as compared with existing SOTA methods. This allows the model to learn the proper mapping between numbers and commentary. The framework also allows the tool to be used for spot-checking purposes, e.g., when humans may have made mistakes in their commentary.
2) In an exemplary embodiment, the AI system is capable of linking a large number of diverse insights with underlying data, compared to existing approaches which focus only on a limited and narrow set of insight types and text commentary.
3) In an exemplary embodiment, the framework has the ability to adapt to new use-cases by collecting online feedback from users. This enables the AI system to be robust, by learning continuously from users to link text and underlying data.
4) In an exemplary embodiment, the framework has a Natural Language Generation (NLG) component. While existing mainstream approaches only mention cell alignments of quantities with sentence text commentary, this approach has the capability to generate text commentary on unseen numerical data.

Figure 5:
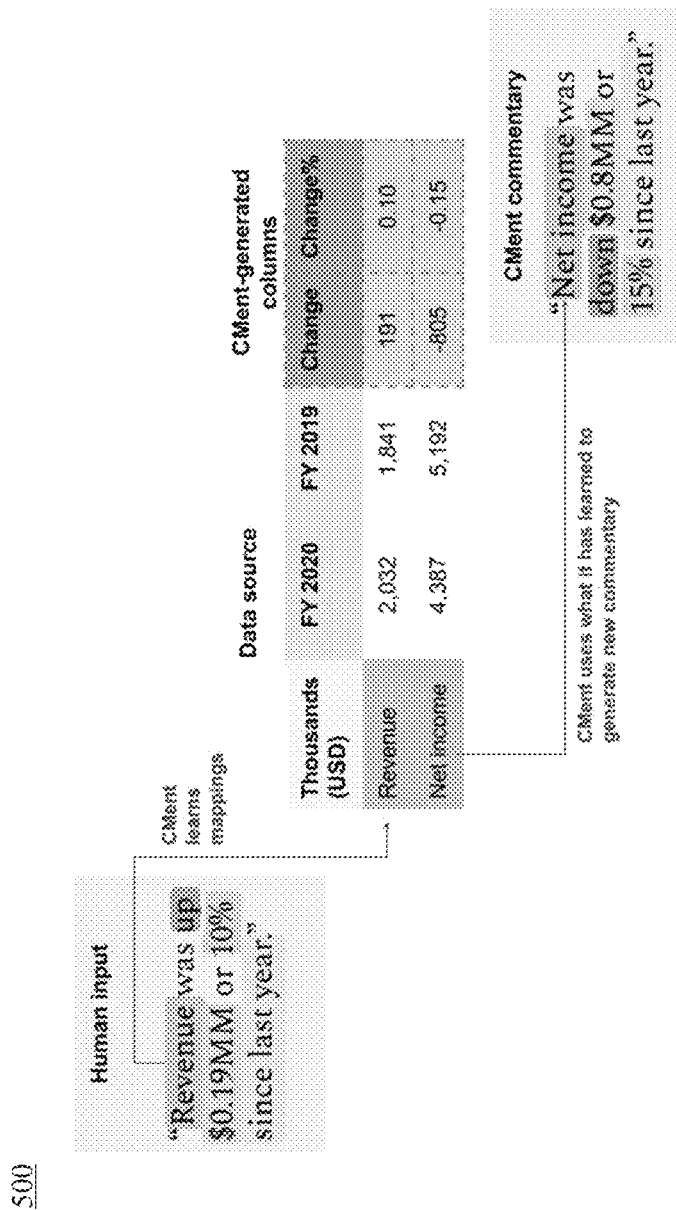
FIG. 5 is a flow diagram that illustrates how human input may guide a learning process in a method for using artificial intelligence and machine learning to automatically generate commentary that relates to quantitative data, according to an exemplary embodiment.

In an exemplary embodiment, in order for CMent to generate meaningful commentary, it needs to learn from previous examples. Referring to FIG. 5, a flow diagram 500 illustrates how human input may guide a learning process in a method for using artificial intelligence and machine learning to automatically generate commentary that relates to quantitative data, according to an exemplary embodiment. The flow diagram 500 shows a table with partial income statement data, where Revenue and Net income have been disclosed for 2019 and 2020. Using the data from the table, a user might generate the descriptive commentary "Revenue was up $0.19 MM or 10% since last year." Then, feeding the data and the commentary into the tool, the user might expect CMent to generate similar commentary for other metrics such as net income. In an exemplary embodiment, in order to do so, CMent goes through four steps.

1) Normalizing the data: The first step is for CMent to make sense of the numeric data. This requires processing each cell in the data tables and identifying relevant column-headers and row-headers. This is not always a straightforward process, because on many occasions, the tabular data is fed to the tool in the form of complicated structures, such as Microsoft Excel spreadsheets with numerous tables on the same page.

In an exemplary embodiment, CMent uses a two-step sequence to process the data: First, CMent identifies all purely numeric cells. Currencies, numbers, percentages, and floating point numbers are all considered pure numeric cells, versus periods, names of metrics, scales, and other partially textual or non-numeric data. Numeric cells are considered the "body", whereas non-numeric cells are considered headers or "contextual information".

In an exemplary embodiment, once each body cell is identified, CMent locates the related contextual information by finding the corresponding row and column headers. This is done by following a simple algorithm: Starting from each body cell, CMent walks upward or leftward until a non-numeric cell is reached. That is the demarcation of a column-header or row-header. The upward or leftward walk is continued until an empty cell, another numeric cell, or the border of the tabular data is reached. All non-numeric cells visited on the path are aggregated. Non-numeric cells visited on the upward path are aggregated as the column-header and the non-numeric cells visited on the leftward path are aggregated as the row header. Finally, a triangulation step adds additional cells to the headers.

FIG. 6A is a diagram 600 that illustrates a parsing of tabular structures in a method for using artificial intelligence and machine learning to automatically generate commentary that relates to quantitative data, according to an exemplary embodiment. The diagram 600 illustrates how the walk allows the tool to identify these headers in a complicated tabular structure. The solid lines identify the upward and leftward walks. The dotted lines illustrate the triangulation step.

In an exemplary embodiment, once the column-headers and row-headers of each cell have been identified, CMent performs an entity tagging operation to process each header. In the example provided in FIG. 6A, "DEALERSHIP C" is tagged as a named entity, whereas "Dec-19" is tagged as a time period. In an exemplary embodiment, CMent supports at least four types of entity tags, including: 1) Named entities—such as names of clients, organizations, banks, businesses, products, individuals, and locations; 2) Periods—these include explicit expressions such as "FY 2019" as well as implicit expressions such as "past two years"; 3) Metrics—various financial metrics such as Revenue, Net income, etc.; and 4) Values—these are the numeric expressions reflecting the value of metrics. Numeric cells are all tagged as values.

In an exemplary embodiment, after entity tagging is complete, each numeric cell is tied to an entity, period, or a metric, or a combination of the three. These combinations of entities are used to represent each numeric value. Referring to FIG. 6B, a table 620 represents an example of an entity tagging process that illustrates how the data point highlighted in FIG. 6A might be normalized by CMent: The term "DEALERSHIP C" is assigned an "Entity" tag; the term "New Unit Sales (units)" is assigned a "Metric" tag; the term "Dec-19" is assigned a "Period" tag, and the term "201" is assigned a "Value" tag.

2) Adding Synthetic Data: In an exemplary embodiment, CMent is programmed to ensure that relevant insights are captured in the commentary. Sometimes these insights are not directly extracted from the data tables. For example, a commentary may mention a change rate of revenue, but the change rate is not guaranteed to have been disclosed in the original data table. In an exemplary embodiment, in order to ensure all relevant data points are present, CMent generates a set of synthetic data points by running common forms of aggregation and analysis. For instance, if a metric such as revenue is reported across many periods, CMent may calculate an incremental delta and change rate values. Referring again to FIG. 5, an example of these synthetic data points are illustrated with dashed borders.

3) Mapping example commentary to data: In an exemplary embodiment, once the underlying data is normalized, CMent tries to map it to the examples of commentary provided by users. As a first step, CMent passes each sentence in the commentary through a similar entity-tagging process as the column-headers and row-headers. This ensures that each entity, metric, period and value is properly tagged in the sentence. CMent then uses these tags to compare the similarity between each cell in the table and each sentence in the commentary.

FIG. 7 is a visual representation 700 of mapping sentences to data tables in a method for using artificial intelligence and machine learning to automatically generate commentary that relates to quantitative data, according to an exemplary embodiment. FIG. 7 illustrates an example in which a sentence has been tagged and compared to a data table. The sentence includes two metrics, one period, one entity, and two values, tagged as "CURB" and "PCT", which stand for currency and percentage.

With these tags in hand, CMent assigns a similarity score to each row in the normalized data table. As an example, the "ABC" entity in the sentence closely matches the "ABC" entity in the table. "Revenue" mentioned in the sentence somewhat closely matches "Revenue Change %" and "Revenue Change" in the table, etc.

While matching entities and metrics is relatively easy, it is tougher to match numeric values. As an example, "$260K" expressed in the sentence can match any of the following numbers: 260—if scaled by a thousand; 2.6—if scaled by a hundred thousand; or 256—if rounded up and scaled by a thousand. All of these examples of scaling and rounding operations are very common in commentary, so CMent must consider all possibilities.

In an exemplary embodiment, once all similarity scores are assigned, CMent calculates an aggregate similarity score for each row. This simple aggregation of individual similarity scores between the table and the sentence may not always be accurate. For example in FIG. 7, the row with the highest aggregate score for "$260K" is the second row, which has a high match on the entity, metric, period and value. However, the correct match would be the third row. This is because the third row is expressing the revenue change between 2017 and 2018. The fourth row expresses the same change, but as a percentage. The sentence mentions "$260K or 8%". The same two values are also present and adjacent in the data table, albeit within a rounding error, i.e., "256" and "7.7%". A human would be able to inspect the data table and quickly infer that the proximity of "256" and "7.7%" in the data table is a major signal for the fact that "$260K" should map to "256".

In an exemplary embodiment, CMent emulates this process by calculating an enhanced score on top for the aggregate scores. The enhanced score accounts for proximities using the below formulation:

$$\text{final\_score}(num_k) = \text{softmax}(s_{candidates(num_k)})$$

$$s_{cell_i} = \sum_j prox(cell_i, cell_j) * \text{score}(cell_j)$$

In these expressions, the "prox" scores augment the raw scores with proximity signals. This boosts the score of "256" and bubbles it up so that it is the top-ranked match for "$260K".

4) Generating new commentary using patterns learned in the previous step: By this point in the process, CMent has mapped existing commentary to the data table with high confidence. The outcomes of the previous steps include a list of common entities, metrics and periods extracted from the example commentary and data tables; and a system of mappings between values in the commentary and values in the data tables.

In an exemplary embodiment, the tool uses these outcomes to generate new commentary for values that have not yet been covered. CMent does this by using Probabilistic Context Free Grammar (PCFG) rules. PCFG refers to a set of flexible rules that model formal language. FIG. 8 is an example 800 that illustrates a modeling of language by using PCFG rules. In the example 800, typical driver/offset language is modeled by PCFG rules.

Each rule is composed of two parts: a head, which functions as an identifier for the rule, and a body, which is composed of a sequence of other rules, which are represented by their own identifiers.

In the example 800, the first rule describes that a commentary sentence ([COMM]) can be composed of a subject, an expression of change, a delta, a temporal expression, and a period. Alternatively, the commentary can be composed of a subject, an expression of change, a delta, a temporal expression, a period, and some context.

The numbers following each rule identify the probability of each rule to occur in commentary. According to the example 800, the probability of a commentary without context is 0.15, and the probability of commentary with context is 0.75. Further down, the rules identify how the context can break down into other pieces.

Given a PCFG system, in an exemplary embodiment, CMent tunes the probabilities assigned to each rule according to the examples it has learned. The mapping step allows the tool to assign probabilities accordingly. In the generation step, CMent uses the rules and probabilities to create new commentary, such as: "ABC Net income dropped by $50K or 11% during 2018, driven by lower Total Sales."

Figure 9:
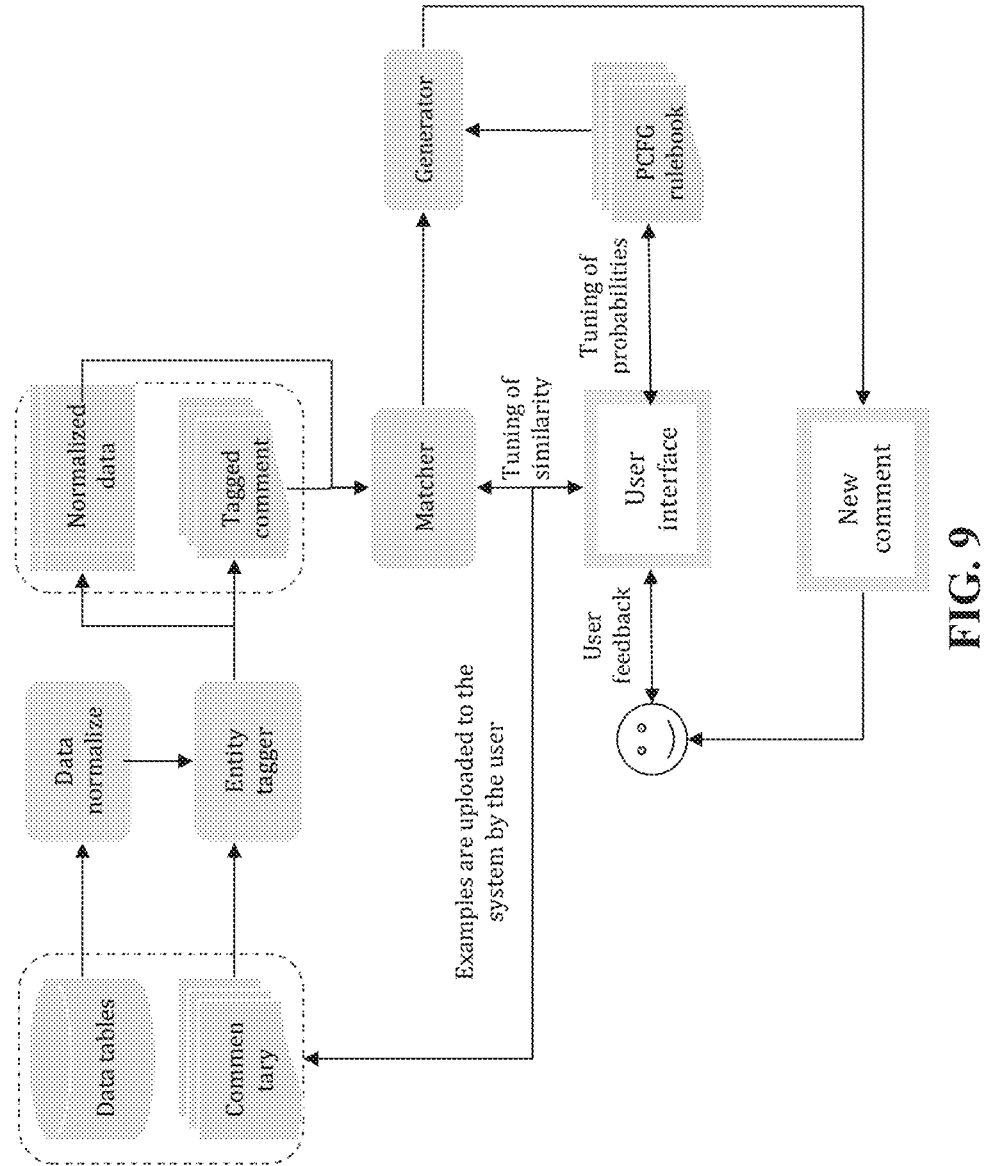
FIG. 9 is a block diagram that illustrates an architecture configured for executing a method for using artificial intelligence and machine learning to automatically generate commentary that relates to quantitative data, according to an exemplary embodiment.

Architecture: FIG. 9 is a block diagram 900 that illustrates an architecture configured for executing a method for using artificial intelligence and machine learning to automatically generate commentary that relates to quantitative data, according to an exemplary embodiment. The tool is composed of several components, including data sources, system modules, and a graphical user interface.

As illustrated in FIG. 9, a user can upload data into the system using the graphical user interface (GUI). The tool processes the data and normalizes it. It also tags entities as described above. The internal representations are then presented back to the user, who can correct mistakes and tune the system. Once ready, the system can then generate commentary for unseen data, which is displayed to the user through the GUI.

Figure 10:
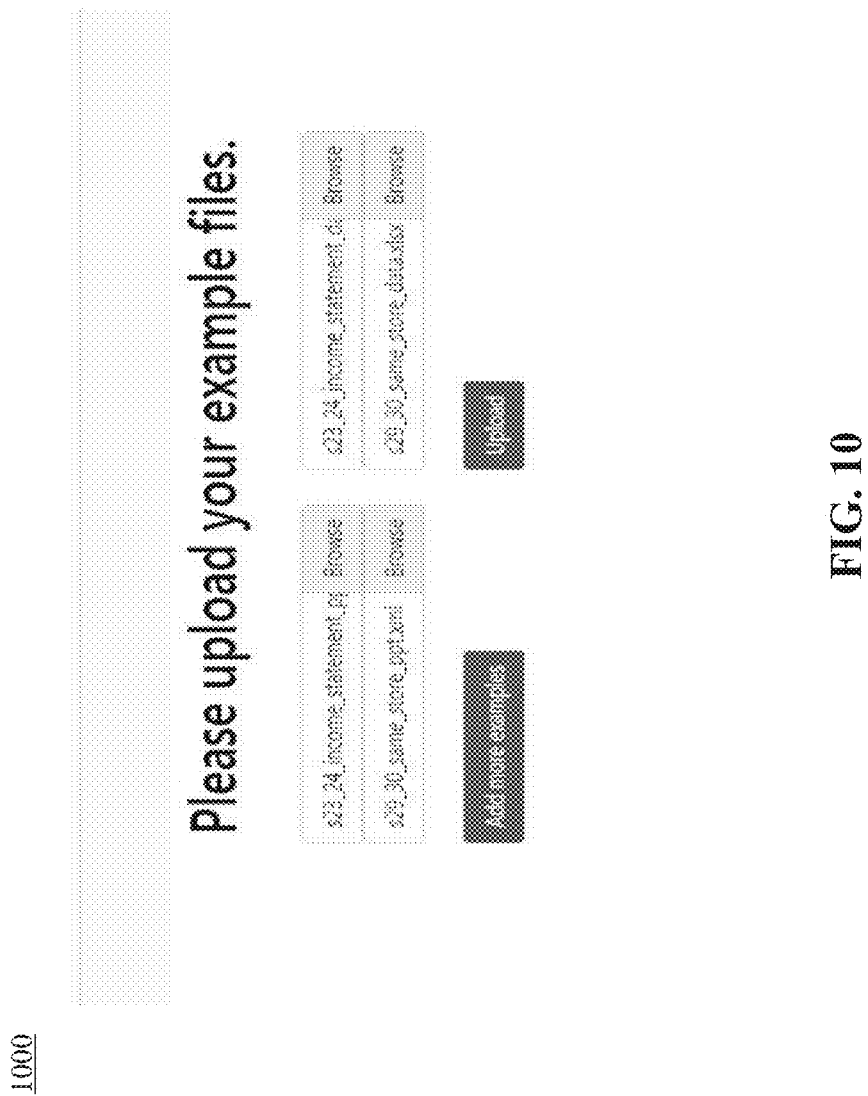
FIG. 10 is a screenshot that illustrates a user interface prompt for facilitating user input of example files in a method for using artificial intelligence and machine learning to automatically generate commentary that relates to quantitative data, according to an exemplary embodiment.

FIG. 10 is a screenshot 1000 that illustrates a user interface prompt for facilitating user input of example files in a method for using artificial intelligence and machine learning to automatically generate commentary that relates to quantitative data, according to an exemplary embodiment. As illustrated in screenshot 1000, the GUI may present a user with a screen that allows the user to upload examples of commentary and data tables. The user can upload as many examples as desired. Each example is composed of a pair of documents—one document represents the data tables (e.g., a spreadsheet), and the other document represents the commentary (e.g., in the form of a document, or a presentation).

In an exemplary embodiment, once the examples are uploaded, the system processes them. FIG. 11 is a screenshot 1100 that illustrates a user interface display of how commentary has been linked to numeric data. The data tables are normalized and entities are tagged in the commentary. As shown in the screenshot 1100, the normalized data table is displayed on the right, while the tagged commentary is displayed on the left.

In an exemplary embodiment, color-coded highlighting may be used to indicate a confidence level. For example, each value in the left-side commentary may be highlighted in black or red. Black values are ones that the system has mapped to the data table with high confidence. Values highlighted in red are ones for which the system does not have a high confidence. These either have very low similarity scores, or are values for which multiple candidates have very similar scores. The system enables the end user to help the system come up with high-confidence matches for these values.

Figure 12:
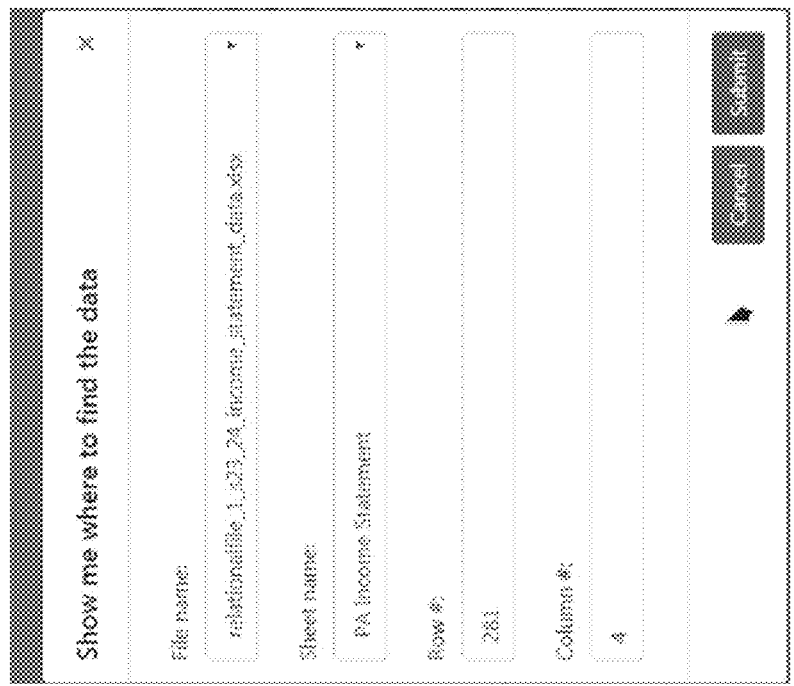
FIG. 12 is a screenshot that illustrates a user interface prompt for facilitating user input of feedback to revise commentary that has been mismatched with numeric data in a method for using artificial intelligence and machine learning to automatically generate commentary that relates to quantitative data, according to an exemplary embodiment.

FIG. 12 is a screenshot 1200 that illustrates a user interface prompt for facilitating user input of feedback to revise commentary that has been mismatched with numeric data. As illustrated in the screenshot 1200, a user can double-click on a red value, or any value for which the confidence level is relatively low. The user can then identify the address of the table cell to which the value should be mapped. Once done, the system changes the color of the previously low-confidence value to black to indicate that it is now a high-confidence match. On the backend, this means that the system is calibrating its parameters in order to generate higher-quality matches.

Figure 13:
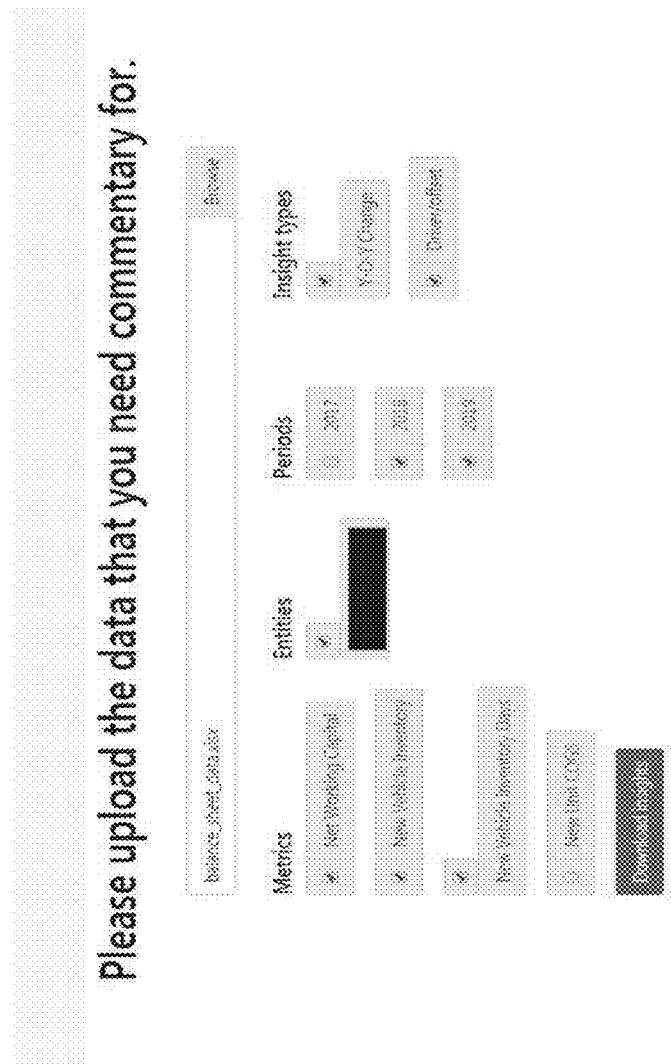
FIG. 13 is a screenshot that illustrates a user interface prompt for facilitating user input of data for which commentary is required in a method for using artificial intelligence and machine learning to automatically generate commentary that relates to quantitative data, according to an exemplary embodiment.

Once the user is satisfied with the quality of the matches that the system has produced, the user can move on to uploading a new data file into the system. The tool processes the data file and identifies all of the entities, metrics, and periods mentioned in the data file. The user can select which entities, metrics or periods are of interest with respect to generating commentary. FIG. 13 is a screenshot 1300 that illustrates a user interface prompt for facilitating user input of data for which commentary is required, according to an exemplary embodiment.

Figure 14:
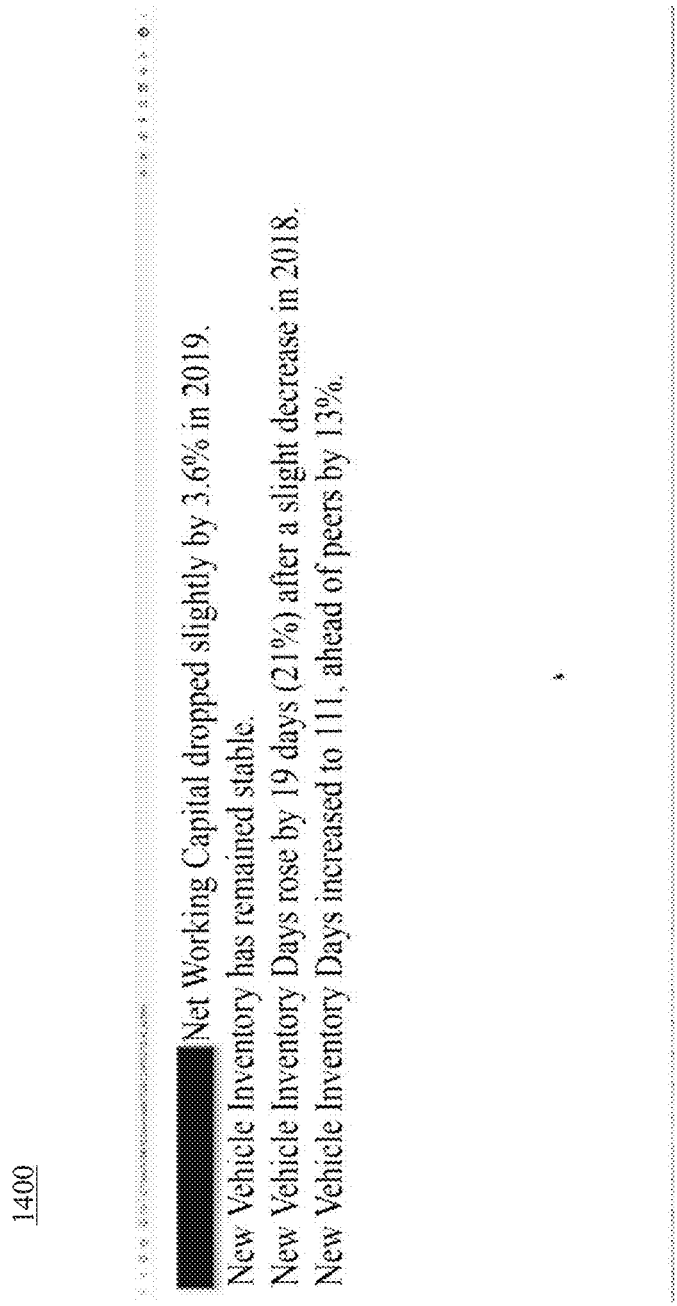
FIG. 14 is a screenshot that illustrates an example of augmented commentary that has been generated for numeric data in a method for using artificial intelligence and machine learning to automatically generate commentary that relates to quantitative data, according to an exemplary embodiment.

Once submitted, the system uses its internal models to generate commentary for the select entities, metrics, and periods. FIG. 14 is a screenshot 1400 that illustrates an example of augmented commentary that has been generated for numeric data, according to an exemplary embodiment.

Accordingly, with this technology, an optimized process for using artificial intelligence and machine learning to automatically generate commentary that relates to quantitative data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for generating commentary with respect to quantitative data, the method being implemented by at least one processor, the method comprising:
   receiving, by the at least one processor, a first tabular data set;
   identifying, by the at least one processor, a first cell having numeric data from within the first tabular data set;
   associating, by the at least one processor, a first column header and a first row header with the first cell;
   assigning, by the at least one processor, a respective header type to each of the first column header and the first row header;
   mapping, by the at least one processor, each of the first cell, the first column header, and the first row header to a first comment from among a plurality of comments, wherein the first comment is prestored in a memory prior to the mapping;
   augmenting, by the at least one processor and based on the mapping of the prestored first comment to a combination of the first cell, the first column header and the first row header, the first comment by generating additional text that supplements the first comment,
   wherein each of the first comment and the additional text indicates a respective confidence level using a color-coded highlight, wherein different color highlights are used to indicate differing confidence levels;
   receiving, by the at least one processor, an input in response to at least one of the confidence levels of the first comment and the additional text; and
   revising, by the at least one processor, both of the first comment and the additional text based on the input.

2. The method of claim 1, wherein each respective header type includes at least one from among a named entity header type, a time period header type, a metric header type, and a numerical value header type.

3. The method of claim 1, wherein the plurality of comments is stored in the memory that includes a historical record of comments previously provided by users, and wherein the mapping comprises using a machine learning algorithm to select the first comment from among the plurality of comments based on the numeric data included in the first cell, the associated first column header, the assigned first column header type, the associated first row header, and the assigned first row header type.

4. The method of claim 1, wherein the augmenting comprises using a Natural Language Processing (NLP) algorithm for generating the additional text.

5. The method of claim 4, wherein the NLP algorithm implements a set of probabilistic context free grammar (PCFG) rules for generating the additional text.

6. The method of claim 1, further comprising displaying, via a graphical user interface (GUI), each of the first comment and the additional text that supplements the first comment, wherein the first tabular data set is received from a user via the GUI.

7. The method of claim 6, further comprising receiving, from the user via the GUI, a file that includes the plurality of comments.

8. The method of claim 6, further comprising displaying, via the GUI, the confidence level associated with each of the first comment and the additional text that supplements the first comment.

9. The method of claim 1, wherein the first comment and the additional text are revised to modify commentary that has been mismatched with the numeric data.

10. The method of claim 1, wherein the different color highlights include a red color to indicate a first confidence level and a black color to indicate a second confidence level.

11. A computing apparatus for generating commentary with respect to quantitative data, the computing apparatus comprising:
a processor;
a memory; and
a communication interface coupled to each of the processor and the memory,
wherein the processor is configured to:
receive, via the communication interface, a first tabular data set;
identify a first cell having numeric data from within the first tabular data set;
associate a first column header and a first row header with the first cell;
assign a respective header type to each of the first column header and the first row header;
map each of the first cell, the first column header, and the first row header to a first comment from among a plurality of comments, wherein the first comment is prestored in the memory prior to being mapped;
augment the first comment by generating additional text that supplements the first comment based on the prestored first comment being mapped to a combination of the first cell, the first column header and the first row header,
wherein each of the first comment and the additional text indicates a respective confidence level using a color-coded highlight, wherein different color highlights are used to indicate differing confidence levels;
receive an input in response to at least one of the confidence levels of the first comment and the additional text; and
revise both of the first comment and the additional text based on the input.

12. The computing apparatus of claim 11, wherein each respective header type includes at least one from among a named entity header type, a time period header type, a metric header type, and a numerical value header type.

13. The computing apparatus of claim 11, wherein the plurality of comments is stored in the memory that includes a historical record of comments previously provided by users, and wherein the processor is further configured to perform the mapping by using a machine learning algorithm to select the first comment from among the plurality of comments based on the numeric data included in the first cell, the associated first column header, the assigned first column header type, the associated first row header, and the assigned first row header type.

14. The computing apparatus of claim 11, wherein the processor is further configured to perform the augmenting by using a Natural Language Processing (NLP) algorithm for generating the additional text.

15. The computing apparatus of claim 14, wherein the NLP algorithm implements a set of probabilistic context free grammar (PCFG) rules for generating the additional text.

16. The computing apparatus of claim 11, wherein the processor is further configured to display, on a display via a graphical user interface (GUI), each of the first comment and the additional text that supplements the first comment, wherein the first tabular data set is received from a user via the GUI.

17. The computing apparatus of claim 16, wherein the processor is further configured to receive, from the user via the GUI and the communication interface, a file that includes the plurality of comments.

18. The computing apparatus of claim 16, wherein the processor is further configured to display, via the GUI, the confidence level associated with each of the first comment and the additional text that supplements the first comment.

19. A non-transitory computer readable storage medium storing instructions for generating commentary with respect to quantitative data, the storage medium comprising executable code which, when executed by a processor, causes the processor to:
receive a first tabular data set;
identify a first cell having numeric data from within the first tabular data set;
associate a first column header and a first row header with the first cell;
assign a respective header type to each of the first column header and the first row header;
map each of the first cell, the first column header, and the first row header to a first comment from among a plurality of comments, wherein the first comment is prestored in a memory prior to being mapped;
augment the first comment by generating additional text that supplements the first comment based on the prestored first comment being mapped to a combination of the first cell, the first column header and the first row header,
wherein each of the first comment and the additional text indicates a respective confidence level using a color-coded highlight, wherein different color highlights are used to indicate differing confidence levels;
receive an input in response to at least one of the confidence levels of the first comment and the additional text; and
revise both of the first comment and the additional text based on the input.

20. The storage medium of claim 19, wherein each respective header type includes at least one from among a named entity header type, a time period header type, a metric header type, and a numerical value header type.

* * * * *